US012617970B2

(12) United States Patent
Klun et al.

(10) Patent No.: US 12,617,970 B2
(45) Date of Patent: May 5, 2026

(54) URETHANE COMPOUNDS COMPRISING PERFLUORINATED GROUP, HYDROLYSABLE SILANE GROUP, AND (METH)ACRYL GROUP

(71) Applicant: 3M INNOVATIVE PROPERTIES COMPANY, St. Paul, MN (US)

(72) Inventors: Thomas P. Klun, Lakeland, MN (US); Matthew R.D. Smith, Woodbury, MN (US); Henrik B. van Lengerich, St. Paul, MN (US); Kayla C. Niccum, Maplewood, MN (US); Christopher S. Lyons, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 677 days.

(21) Appl. No.: 17/925,336

(22) PCT Filed: Jun. 7, 2021

(86) PCT No.: PCT/IB2021/054977
§ 371 (c)(1),
(2) Date: Nov. 15, 2022

(87) PCT Pub. No.: WO2021/250544
PCT Pub. Date: Dec. 16, 2021

(65) Prior Publication Data

US 2023/0193074 A1 Jun. 22, 2023

Related U.S. Application Data

(60) Provisional application No. 63/037,799, filed on Jun. 11, 2020.

(51) Int. Cl.

| | |
|---|---|
| ***C09D 175/16*** | (2006.01) |
| ***C08G 18/28*** | (2006.01) |
| ***C08G 18/67*** | (2006.01) |
| ***C08G 18/78*** | (2006.01) |
| ***C08G 18/80*** | (2006.01) |
| ***C08G 18/81*** | (2006.01) |
| ***C08G 18/83*** | (2006.01) |

(52) U.S. Cl.
CPC ....... *C09D 175/16* (2013.01); *C08G 18/2885* (2013.01); *C08G 18/673* (2013.01); *C08G 18/6755* (2013.01); *C08G 18/678* (2013.01); *C08G 18/7831* (2013.01); *C08G 18/8087* (2013.01); *C08G 18/81* (2013.01); *C08G 18/8175* (2013.01); *C08G 18/837* (2013.01)

(58) Field of Classification Search
CPC ............. C09D 175/16; C08G 18/6755; C08G 18/678; C08G 18/81; C08G 18/2885; C08G 18/7831; C08G 18/8087; C08G 18/8175; C08G 18/837; C08G 18/673
See application file for complete search history.

(56) References Cited

U.S. PATENT DOCUMENTS

| | | | | |
|---|---|---|---|---|
| 5,461,173 | A | 10/1995 | Sato et al. | |
| 7,335,786 | B1 | 2/2008 | Iyer et al. | |
| 7,718,264 | B2 | 5/2010 | Klun et al. | |
| 7,728,098 | B2 | 6/2010 | Dams et al. | |
| 7,745,653 | B2 | 6/2010 | Iyer et al. | |
| 7,825,272 | B2 | 11/2010 | Iyer et al. | |
| 7,897,678 | B2 | 3/2011 | Qiu | |
| 8,015,970 | B2 | 9/2011 | Klun et al. | |
| 8,563,221 | B2 * | 10/2013 | Qiu | G03F 7/0048 430/311 |
| 8,729,211 | B2 | 5/2014 | Klun et al. | |
| 8,748,060 | B2 | 6/2014 | Qiu | |
| 9,790,396 | B2 | 10/2017 | Klun et al. | |
| 10,696,788 | B2 | 6/2020 | Honda et al. | |
| 2006/0216524 | A1 | 9/2006 | Klun et al. | |
| 2008/0027203 | A1 | 1/2008 | Dams | |
| 2008/0314287 | A1 | 12/2008 | Clark et al. | |
| 2009/0025727 | A1 | 1/2009 | Klun et al. | |
| 2010/0129672 | A1 | 5/2010 | Hao et al. | |
| 2018/0138433 | A1 | 5/2018 | Klun et al. | |

FOREIGN PATENT DOCUMENTS

| | | |
|---|---|---|
| CN | 101490135 A | 7/2009 |
| CN | 101754991 A | 6/2010 |
| CN | 101809464 A | 8/2010 |

(Continued)

OTHER PUBLICATIONS

International Search Report for PCT International Application No. PCT/IB2021/054977, mailed on Aug. 28, 2021, 3 pages.

*Primary Examiner* — Rabon A Sergent
(74) *Attorney, Agent, or Firm* — Carolyn A. Fischer

(57) ABSTRACT

A compound is described having following formula: (I) Also described is a mixture of compounds comprising the reaction product of i) a urethane compound comprising a perfluorooxyalkyl moiety and at least two (meth)acryl groups; and ii) a silane compound comprising hydrolysable groups and a group selected from amine or mercapto group; wherein i) and ii) are reacted at an equivalent ratio of excess compound i) such that (meth)acryl groups remain unreacted. Methods and articles are also described.

$$[R_f\text{-}QXC(O)HN]_m\text{-}R_i\text{-}[NHC(O)OQ(XC(O)C(R^4){=}CH_2)_p$$
$$(XC(O)CH_2CH_2R^1R^2Si(Y)_b(R^3)_{3\text{-}b})_a]_n$$

16 Claims, 4 Drawing Sheets

(56) References Cited

FOREIGN PATENT DOCUMENTS

| | | | |
|---|---|---|---|
| KR | 20100121283 | A | 11/2010 |
| KR | 20100121284 | A | 11/2010 |
| TW | 201708310 | A | 3/2017 |
| WO | 2006102383 | A1 | 9/2006 |
| WO | 2017003870 | A1 | 1/2017 |
| WO | 2017172390 | A1 | 10/2017 |
| WO | 2020095258 | A1 | 5/2020 |
| WO | 2021229338 | A1 | 11/2021 |
| WO | 2021229340 | A1 | 11/2021 |
| WO | 2021229348 | A1 | 11/2021 |
| WO | 2021229547 | A1 | 11/2021 |
| WO | 2021231068 | A1 | 11/2021 |

* cited by examiner

URETHANE COMPOUNDS COMPRISING PERFLUORINATED GROUP, HYDROLYSABLE SILANE GROUP, AND (METH)ACRYL GROUP

SUMMARY

Although various compounds have been described, industry would find advantage in fluorinated compounds that improve adhesion to metal oxide containing surfaces.

In one embodiment, a compound is described having the following formula:

(Formula 1)

$$[R_f\text{-}QXC(O)HN]_m\text{-}R_i\text{-}[NHC(O)OQ(XC(O)C(R^4){=}CH_2)_p$$
$$(XC(O)CH_2CH_2R^1R^2Si(Y)_b(R^3)_{3\text{-}b})_a]_n$$

$R_i$, is the residue of a polyisocyanate;

$R_f$ is a monovalent perfluorooxyalkyl group;

Q is independently a covalent bond or an organic linking group having a valency of at least 2;

X is O, S or NR, wherein R is H or an alkyl group having 1 to 4 carbons;

$R^4$ is H or $CH_3$;

$R^1$ is —S— or —N($R^5$)—, wherein $R^5$ is $C_1$-$C_4$ alkyl or —$R^2Si(Y)_b(R^3)_{3\text{-}b}$;

$R^2$ is a divalent alkylene group optionally comprising one or more catenary oxygen atoms;

Y is a hydrolysable group;

$R^3$ is a non-hydrolysable group;

b is 1, 2, or 3;

m is at least 1;

n is at least 1;

for each n, p+a is no greater than 6 with the provisos that for at least one n, a is at least 1; and for at least one n, and p is at least 1.

In another embodiment, a mixture of compounds is described comprising the reaction product of i) a urethane compound comprising a perfluorooxyalkyl moiety and at least two (meth)acryl groups; and ii) a silane compound comprising hydrolysable groups and a group selected from amine or mercapto group; wherein i) and ii) are reacted at an equivalent ratio of excess compound i) such that (meth)acryl groups remain unreacted.

In another embodiment, a method of making a cured composition is described comprising providing a polymerizable composition comprising the compound or mixture of compounds as described herein; and curing the (meth)acryl groups.

In other embodiments, articles are described comprising a film or film layer comprising the polymerizable composition comprising the compound or mixture of compounds as described herein. The polymerizable composition may further comprise other non-fluorinated or fluorinated free-radically polymerizable monomer(s), oligomer(s), or a combination thereof. In some embodiments, the film layer is disposed on a surface of a substrate, such as a (e.g. nanostructured) patterned surface. In some embodiments, the surface of the substrate comprises a metal oxide.

DETAILED DESCRIPTION

Figure 1N:
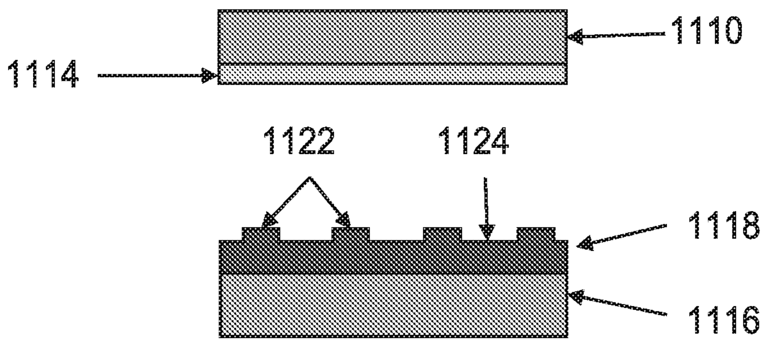
FIGS. 1N-1V are side view of an illustrative process.
Figure 1O:
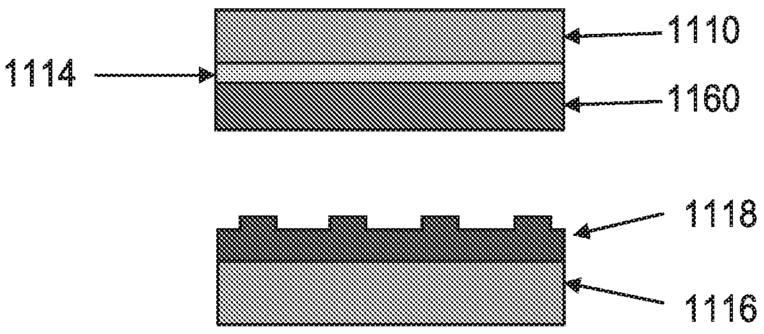
Figure 1P:
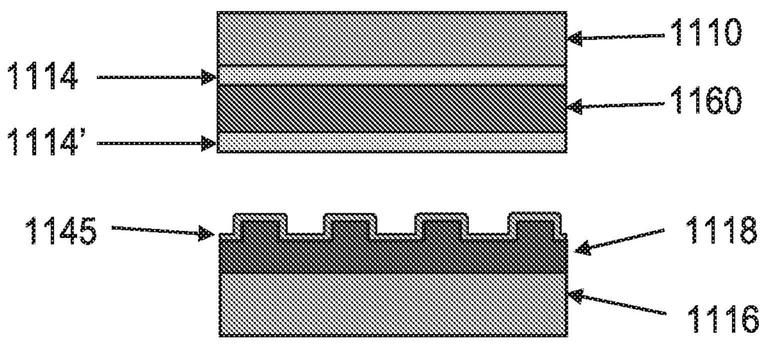
Figure 1Q:
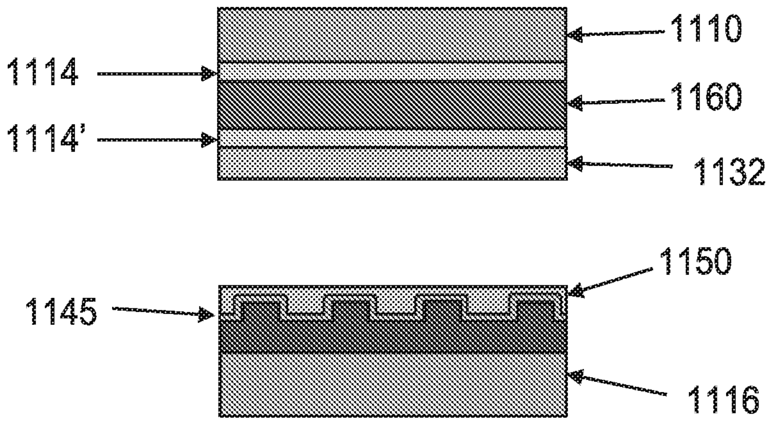

Presently described are urethane compounds comprising a perfluorinated group, a hydrolysable silane group, and a (meth)acryl group according to Formula 1.

As used herein the term "catenary" refers to substituting a carbon atom of a carbon chain with a substituent (e.g. O or N). Thus, a pendent substituent (e.g. —OH) bonded to a carbon atom is not a catenary oxygen atom.

The compounds described herein can be prepared by any suitable method.

In some embodiments, a mixture of compounds is described comprising the Michael addition reaction product of i) a urethane compound comprising a perfluorooxyalkyl moiety and at least two (meth)acryl groups; and ii) a silane compound comprising hydrolysable groups and a group selected from amine or mercapto group. As used herein, "(meth)acryl" means (meth)acrylate, thio(meth)acrylate or (meth)acrylamide. In some embodiments, acryl is preferred i.e. acrylate, thioacrylate, and acrylamide.

Compounds i) and ii) respectively are reacted at an equivalent ratio such that there is an excessive number of (meth)acryl groups with respect to the number of active hydrogens of the amine or mercapto groups. Mercapto groups have one active hydrogen. However, amines can have one or two active hydrogens. For example, primary amines contain two active hydrogens and can Michael add to potentially two acryl groups. Secondary amines have only one active hydrogen and can Michael add to only one acryl group. In some embodiments, the equivalent ratio of i) to ii) is at least 1.1:1, 1.2:, 1.3:1, 1.4:1, 1.5:1, 1.6:1, 1.7:1, 1.8:1, 1.9:1, or 2:1. In some embodiments, the equivalent ratio of i) to ii) ranges from 2:1 to 99:1. In some embodiments, the equivalent ratio of i) to ii) is at least 3:1, 4:1:, 5:1, 6:1, 7:1, 8:1, or 9:1.

An illustrative synthesis is depicted as follows:

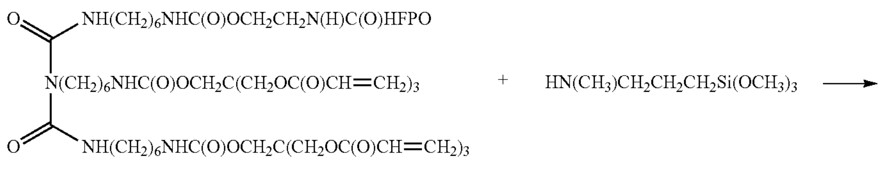

-continued

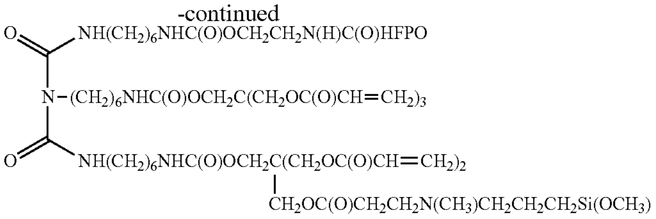

The i) urethane compound comprising a perfluorooxyalkyl moiety and at least two (meth)acryl groups and ii) silane compound comprising hydrolysable groups and a group selected from amine or mercapto group are combined in a suitable solvent. When a homogeneous mixture or solution is obtained a catalyst is optionally added, and the reaction mixture is heated at a temperature, and for a time sufficient for the reaction to occur. Progress of the reaction can be determined by monitoring the olefin concentration by use of $^1$H Fourier Transform Nuclear Magnetic Resonance (FT-NMR).

In typical embodiments, the solvent is non-fluorinated, such as in the case of ketones such as acetone, methyl ethyl ketone (MEK), methyl isobutyl ketone, methyl amyl ketone and N-methyl pyrrolidone (NMP); ethers such as tetrahydrofuran, 2-methyl tetrahydrofuran and methyl tetrahydrofurfuryl ether; esters such as methyl acetate, ethyl acetate and butyl acetate; cyclic esters such as delta-valerolactone and gamma-valerolactone.

Preparation of urethane compounds comprising a perfluorooxyalkyl moiety and at least two (meth)acryl groups is known. See for example, WO 2006/102383; incorporated herein by reference.

Typically, compound i) is made by first reacting the polyisocyanate with the perfluorooxyalkyl-containing alcohol, thiol, or amine, followed by reaction with the hydroxy functional (meth)acrylate, usually in a non-hydroxylic solvent and in the presence of a catalyst such as an organotin compound. Alternatively, compound i) is made by reacting the polyisocyanate with the hydroxy functional (meth)acrylate, followed by reaction with the perfluorooxyalkyl-containing alcohol, thiol, or amine, usually in a non-hydroxylic solvent and in the presence of a catalyst such as an organotin compound. In addition, compound i) could be made by reacting all three components simultaneously, usually in a non-hydroxylic solvent and in the presence of a catalyst such as an organotin compound.

Illustrative hydroxy functional multi(meth)acrylates include for example 1,3-glycerol dimethacrylate and pentaerythritol triacrylate. When the isocyanate comprises at least three isocyanate groups hydroxyl functional mono (meth)acrylate can be utilized. Various hydroxyl functional mono(meth)acrylate are known including for example hydroxyethyl (meth)acrylate and polycaprolactone. In some embodiments, a mixture of hydroxyl-functional multi(meth) acrylate(s) and hydroxyl-functional mono(meth)acrylate(s) may be utilized.

In some embodiments, the urethane compound comprising a perfluorooxyalkyl moiety and at least two (meth)acryl groups may have Formula 2A:

$$R_i\text{—}(NHC(O)XQR_f)_{m2},\text{—}(NHC(O)OQ(A)_{p2})_{n2} \quad \text{(Formula 2A)}$$

wherein $R_i$ is a residue of a polyisocyanate; X is O, S or NR, where R is H or lower alkyl of 1 to 4 carbon atoms; Q is a covalent bond or organic linking group; $R_f$ is monovalent perfluorooxyalkyl group; and A is a (meth)acryl functional group —XC(O)C($R_2$)=$CH_2$, where $R_2$ is a H or methyl; m2 is at least 1; n2 is at least 1; p2 is 2 to 6; and m2+n2 is 2 to 10. Both units (i.e. m2 and n2) are bonded to the residue of a polyisocyanate. Thus, when $R_i$ is a residue of a diisocyanate, Formula 2A can also be represented by following Formula 2B:

$$[R_fQXC(O)HN)]_{m2}\text{—}R_i\text{—}[NHC(O)OQ(XC(O)C(R^4)=CH_2)_{p2}]_{n2} \quad \text{(Formula 2B)}$$

Q (of Formulas 1 and 2A-2B) can be a straight or branched chain or cycle-containing connecting group. Q can include a covalent bond, an alkylene, an arylene, an aralkylene, or an alkarylene. Q can optionally include heteroatoms such as O, N, and S, and combinations thereof. Q can also optionally include a heteroatom-containing functional group such as carbonyl or sulfonyl, and combinations thereof.

In some embodiments, the monovalent perfluorooxyalkyl group ($R_f$ of Formulas 1 and 2A-2B) comprises moieties of 1 to 6 (e.g. linear or branched) perfluorinated carbon atoms and a single oxygen atoms, such as $CF_3CF_2CF_2O$—. In some embodiments, the number of perfluorinated carbon atoms is at least 2 or 3. In some embodiments, the number of perfluorinated carbon atoms is no greater than 5 or 4.

In typical embodiments, the monovalent perfluorooxyalkyl group comprises perfluorinated poly(oxyalkylene) groups having repeat units of divalent perfluoroxyalkylene groups, having the general structure —$[C_mF_{2m}O]_s$—, wherein for each s, m independently ranges from 1 to 6. In some embodiments, m is at least 2 or 3. In some embodiments, the m is no greater than 5 or 4. In one embodiment, Rf is "HFPO—". When n is 1 and $R_f$ is a monovalent perfluorooxyalkyl group, HFPO— refers to the end group $CF_3CF_2CF_2O$—$[CF(CF_3)CF_2O]_s$—$CF(CF_3)$— wherein s is an integer of 2 to 25. In some embodiments, s is at least 3, 4, 5, 6, 7, 8, 9, or 10. In some embodiments, s is no greater than 24, 23, 22, 21, 20, 19, 18, 17, 16, 15, 14, 13, 12, 11, or 10. HFPO— generally exist as a distribution or mixture of molecules with a range of values for s. Thus, s may be expressed as an average value. Such average value is typically not an integer.

The surface tension can be determined by dissolving the compound or mixture of compounds in a solvent and taking an image of a pendant drop supported by a needle (with an outer diameter of 1.8 mm) using a Kruess DSA100 drop shape analyzer, using the Young-Laplace shape fitting feature of the Kruess Drop Shape Software version 1.9.2, and entering the density of the solvent (e.g. 1-methoxy-2-propanol having a density of 0.92 g/ml). In some embodiments, compound i) has a surface tension of less than 1-methoxy-2-propanol, having a surface tension of 27.7 mNewtons/m for concentrations ranging from 0.005 to 10 wt. % dissolved in 1-methoxy-2-propanol. The surface tension of the solution decreases as the concentration increases. The surface tension of compound i) is typically no greater than 20 mNewtons/m at a concentration of 0.5 or 1 wt. % dissolved in 1-methoxy-2-propanol. In some embodiments, the surface tension of compound i) is no greater than 16.8 at a concentration of 6.7 wt. % dissolved in 1-methoxy-2-propanol. Since silane units are typically a small weight fraction of the total molecular weight of the HFPO functional urethane compound comprising a perfluorooxyalkyl moiety and at least two (meth)acryl groups, the (e.g. Michael) addition of units n with silane group(s) would not be expected to substantially raise the surface tension. Thus, the compounds described herein further comprising silane group(s) would also have a surface tension in the range just described. The low surface tension contributes to forming a continuous coating, free of defects such as bubbles, on a (e.g. nano) structured surface.

Numerous aliphatic or aromatic polyisocyanates may be used in the preparation of fluorinated (meth)acryl silane urethane compound(s) as described. Such polyisocyanates may be diisocyanates having two NCO group or polyisocyanates having three of more NCO groups. Non-limiting example of polisocyanate materials are commercially available such Desmodur™ 3300, Desmodur™ TPLS2294, and Desmodur™ N 3600, all obtained from Bayer Polymers LLC of Pittsburgh, Pennsylvania. In some embodiments, the polyisocyanate is based on hexamethylene diisocyanate ("HDI") are utilized. One commercially available derivative of HDI is Desmodur™ N100, available from Bayer Polymers LLC of Pittsburgh, Pennsylvania, depicted as follows:

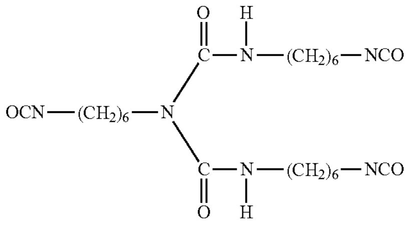

The residue of an isocyanate has the same formula omitting the NCO groups. Thus, the residue of Desmodur N100 is depicted as follows:

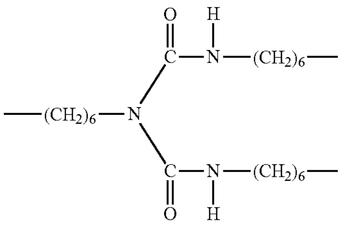

One representative (meth)acryl functional perfluorinated urethane compound prepared by the reaction of Desmodur N100 with HFPO oligomer amidol two equivalents of pentaerythritol triacrylate is depicted as follows:

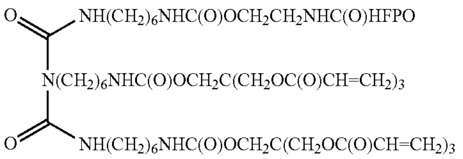

In some embodiments, the polyisocyanate may comprise a single polyisocyanate compound such as a diisocyanate compound or triisocyanate compound, or a mixture thereof. It is appreciated that polyisocyanates, and especially diisocyanates. can further comprise oligomers. Thus, $R_i$ can comprise residues of diisocyanate oligomerization products.

Some representative hexamethylene diisocyanate ("HDI") oligomers are depicted as follows:

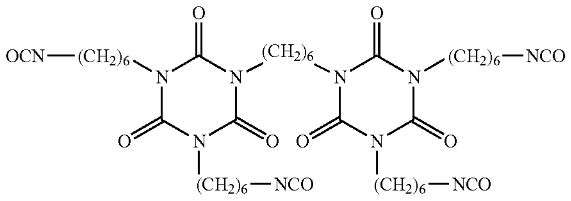

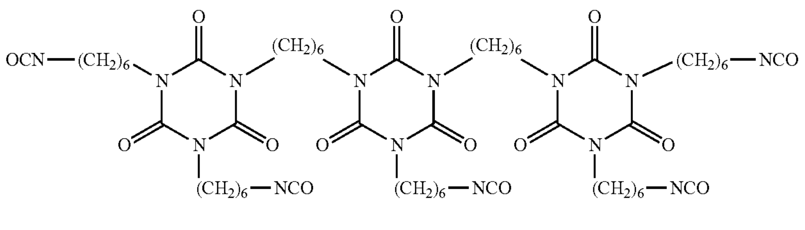

The concentration of such oligomers is typically less than 40, 35, 30, 25, 20, 15, 10 or 5 wt. %. In view of inclusion of oligomer, the number of isocyanates (—NCO) groups is typically an average value. Thus, when a polyisocyanate is characterized as a triisocyanate, the majority of compound are triisocyantes. However, the average —NCO functionality is often a non-integer that is greater than 3. For example, Desmodur™ 3300 is described as having a functionality of >3.2. Thus, the reaction product comprises a mixture of compounds wherein at least one amino silane or mercapto silane has been reacted with at least one of the (meth)acryl group of the urethane compound comprising a perfluorooxyalkyl moiety and at least two (meth)acryl groups.

In some embodiments of Formula 1, $R_i$ is the residue of a diisocyanate, m+n averages 2, and both a and p average at least 1.

In other embodiments of Formula 1, $R_i$, is the residue of a triisocyanate, m+n averages 3, n averages 2, and for each n, both a and p average at least 1. Alternatively, wherein $R_i$ is the residue of a triisocyanate, m+n averages 3, n averages 2, wherein for the first n, a average 0 and p averages 1; and for the second n, a average 1 and p average zero.

In other embodiments of Formula 1, $R_i$, is the residue of a polyisocyanate such that m+n averages at least 4, 5, 6, 7, 8, 9, or 10; n averages at least 3, 4, 5, 6, 7, 8, 9, or 10, wherein for at least one n, a averages 0 and p averages 1; and for at least one n, a average 1 and p averages zero.

The mole fraction of compounds according to the Formula 1 in a mixture also containing of compounds Formulas 2A-2C, which are unreacted with amino or thiosilanes, is at least 0.01, 0.02, 0.03, 0.04, 0.05, 0.06, 0.07, 0.08, 0.09, 0.10, 0.15, 0.20, 0.25, 0.30, or 0.35 mole fraction. The mole fraction of compounds according to the Formula 1 in a mixture also containing of compounds Formulas 2A-2C, which are unreacted with amino or thiosilanes, are typically no more than 0.80, 0.70, 0.60, 0.50, or 0.40 mole fraction.

The silane compounds generally have the formula $R^{22}R^{25}Si(Y)_p(R^{26})_{3-p}$ as defined above in Formula 1. In typical embodiments, Y is a $C_1$-$C_4$ alkoxy group and most typically a $C_1$-$C_2$ alkoxy group. $R^{26}$ is typically $C_1$-$C_6$ alkyl, an aromatic group such as phenyl, or hydrogen.

Examples of silane compounds comprising hydrolysable groups and an amine group include 3-aminopropyltrimethoxysilane (SILQUEST A-1110), 3-aminopropyltriethoxysilane (SILQUEST A-1100), N-methyl-3-aminopropyltrimethoxysilane, N-butyl-3-aminopropyltrimethoxysilane (DYNASYLAN 1189), bis(3-trimethoxysilylpropyl)amine, bis(3-triethoxysilylpropy) amine, bis(3-trimethoxysilylpropyl)n-methylamine, 3-(2-aminoethyl)aminopropyltrimethoxysilane (SILQUEST A-1120), SILQUEST A-1130, (aminoethylaminomethyl)-phenethyltrime thoxysilane, (aminoethylaminomethyl)-phenethyltriethoxysilane, N-(2-aminoethyl)-3-aminopropylmethyldimethoxysilane (SILQUEST A-2120), bis-(.gamma.-triethoxysilylpropyl)amine (SILQUEST A-1170), N-(2-aminoethyl)-3-aminopropyltributoxysilane, 6-(aminohexylaminopropyl)trimethoxysilane, 4-aminobutyltrimethoxysilane, 4-aminobutyltriethoxysilane, p-(2-aminoethyl)phenyltrimethoxysilane, 3-aminopropyltris (methoxyethoxyethoxy)silane, 3-aminopropylmethyldiethoxysilane, 3-(N-methylamino) propyltrimethoxysilane, N-(2-aminoethyl)-3-aminopropylmethyldimethoxysilane, N-(2-aminoethyl)-3-aminopropylmethyldiethoxysilane, N-(2-aminoethyl)-3-aminopropyltrimethoxysilane, N-(2-aminoethyl)-3-aminopropyltriethoxysilane, 3-aminopropylmethyldiethoxysilane, 3-aminopropylmethyldimethoxysilane, 3-aminopropyldimethylmethoxysilane, and 3-aminopropyldimethylethoxysilane.

Examples of silane compounds comprising hydrolysable groups and a mercapto group include for example 3-mercaptopropyltriethoxysilane; 3-mercaptopropyl-trimethoxysilane; 11-mercaptoundecyltrimethoxysilane; s-(octanoyl) mercapto-propyltriethoxysilane; (mercaptomethyl) methyldiethoxysilane; and 3-mercaptopropylmethyldimethoxysilane.

When compound ii) comprises two silane groups, such as in the case of bis(3-trimethoxysilylpropyl)amine, or bis(3-triethoxysilylpropy)amine, $R^5$ is $—R^2Si(Y)_b(R^3)_{3-b}$ for at least one n.

Various other silane compounds comprising hydrolysable groups and an amine or mercapto group are described in the literature.

Since the perfluoroxyalkyl group of the starting urethane compounds comprising at least two (meth)acryl groups comprises a mixture of perfluoroxyalkyl groups of various chain lengths, the resulting fluorinated silane compound also comprises a mixture of perfluoroxyalkyl groups of various chain lengths. The compounds (e.g. according to Formulas 1) typically have a (e.g. number average) molecular weight of no greater than 5000, 4000, 3000, 2500, 2000, 1500, 1000, or 500 g/mole. In some embodiments, the (e.g. number average) molecular weight is at least 500, 1000, or 1500 g/mole. During the synthesis of the compound, the molecular weight can be calculated by the equivalent weight of the reactants. Alternatively, the molecular weight of the coupling agent can be determined by nuclear magnetic resonance (NMR), liquid chromatography optionally followed by NMR, and/or mass spectrometry.

In some embodiments, the compound (e.g. according to Formulas 1 and 2) has an average wt. % fluorine of at least 5, 10, 15, 20, 25, or 30 wt. %. During the synthesis of the compound, the wt. % fluorine can be calculated from the reactants. Alternatively, the wt. % fluorine can be calculated utilizing Combustion Ion Chromatography (CIC) as described in WO2017/172390. In some embodiments, the compound has an average wt. % fluorine of no greater than 50, 45, or 40 wt. %.

Also described is a method of making a cured composition comprising providing a (e.g. photo)polymerizable composition comprising the fluorinated (meth)acryl silane urethane compounds as described herein; and curing the polymerizable composition.

In some embodiments, the polymerizable composition further comprises other non-fluorinated or fluorinated free-radically polymerizable monomer(s), oligomer(s), or a combination thereof.

In some embodiments, the fluorinated free-radically polymerizable oligomer(s) are compound i), as previously described.

Useful non-fluorinated multi-(meth)acrylate monomers and oligomers include:

(a) di(meth)acryl containing monomers such as 1,3-butylene glycol diacrylate, 1,4-butanediol diacrylate, 1,6-hexanediol diacrylate (SR 238), 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing monomers such as glycerol triacrylate, trimethylolpropane triacrylate, ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acryl containing monomers such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

In some embodiments, the polymerizable composition comprises an di(meth)acryl containing monomers, such 1,6-hexanediol diacrylate (SR 238), in an amount of at least 25, 30, 35, 40, 45, or 50 wt. %.

Oligomeric (meth)acryl monomers such as, for example, urethane acrylates, polyester acrylates, and epoxy acrylates can also be employed.

In some embodiments, the polymerizable composition comprises an aliphatic urethane acrylate oligomer available under the trade designation PHOTOMER 6210 having a tensile strength of less than 10,000 kPa; an elongation of 30-50%, a modulus ranging from 50,000 to 10,000 kPa; and a glass transition temperature ranging from 25 to 50° C. The amount of oligomeric (meth)acryl monomers may be at least 50, 55, 60, 65, 70 or 75 wt. %.

Such (meth)acrylate monomers are widely available from vendors such as, for example, Sartomer Company of Exton, Pennsylvania; Cytec Industries of Woodland Park, N; and Aldrich Chemical Company of Milwaukee, Wisconsin.

In typical embodiments, the (e.g. photo)polymerizable composition comprises one or more fluorinated (meth)acryl silane urethane compound(s) as described herein in an amount of at least 1, 2, 3, 4, 5, 6, 7, 8, 9, or 10 wt. % solids. The amount of fluorinated (meth)acryl silane urethane compound(s) as described is typically no greater than 50 wt. % solids of the total polymerizable composition. The fluorinated (meth)acryl silane urethane compound(s) as described herein may be a single compound or mixture of compounds as described herein.

The (meth)acryl groups are subject to free-radical curing by exposure to ultraviolet radiation (UV), electron beam (e-beam), ionizing radiation (gamma rays), plasma radiation as well as thermal polymerization. In some embodiments, the method further comprises coating the polymerizable composition onto a substrate prior to curing. In some embodiments, upon radiation curing the cured polymerizable composition forms a film or film layer, such as a films layer on a patterned surface of a tool.

In some embodiments, radiation curing comprises exposing the (e.g. coated) composition to wavelengths of ultraviolet (UV) and visible light.

UV light sources can be of various types. Low light intensity sources, such as blacklights, generally provide intensities ranging from 0.1 or 0.5 $mW/cm^2$ (millwatts per square centimeter) to 10 $mW/cm^2$ (as measured in accordance with procedures approved by the United States National Institute of Standards and Technology as, for example, with a UVIMAP UM 365 L-S radiometer manufactured by Electronic Instrumentation & Technology, Inc., in Sterling, VA). High light intensity sources generally provide intensities greater than 10, 15, or 20 $mW/cm^2$ ranging up to 450 $mW/cm^2$ or greater. In some embodiments, high intensity light sources provide intensities up to 500, 600, 700, 800, 900 or 1000 $mW/cm^2$. UV light can be provided by various light sources such as light emitting diodes (LEDs), fluorescent blacklights, arc-lamps such as xenon-arc lamps and medium and low-pressure mercury lamps (including germicidal lamps), microwave-driven lamps, lasers, etc., or a combination thereof. The composition can also be polymerized with higher intensity light sources as available from Fusion UV Systems Inc. Lamps that emit ultraviolet or blue light are typically preferred. The UV exposure time for polymerization and curing can vary depending on the intensity of the light source(s) used. For example, curing with a low intensity light source can be accomplished with an exposure time ranging from about 30 to 300 seconds; whereas curing with a high intensity light source can be accomplished with shorter exposure time ranging from about 1 to 20 seconds.

In other embodiments, an article is described comprising a film or film layer comprising a cured polymerizable composition comprising the fluorinated (meth)acryl silane urethane compound(s) described herein. The polymerizable composition further comprises non-fluorinated or fluorinated free-radically polymerizable monomer(s), oligomer(s), or a combination thereof, as previously described.

In some embodiments, the film layer is disposed on a surface of a substrate. In some embodiments, the film layer is disposed on a (e.g. nanostructured) patterned surface. The surface of the substrate may comprise a metal oxide.

In some embodiments, the cured polymerizable composition may be utilized as a masking layer (1150) in a method of forming an etched nano-scale pattern as described in FIG 1.1N-IV and FIGS. 11N-11V of WO 2020/095258; incorporated herein by reference.

Figure 1R:
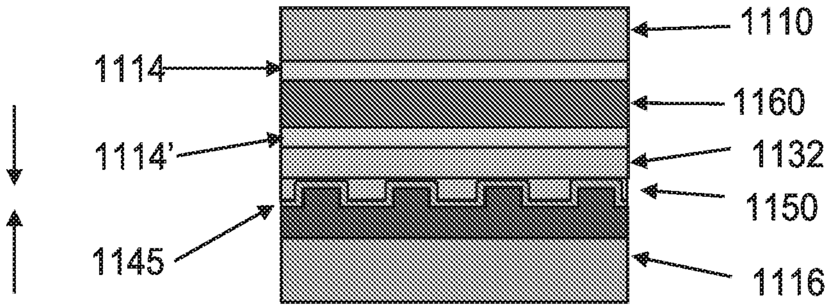
Figure 1S:
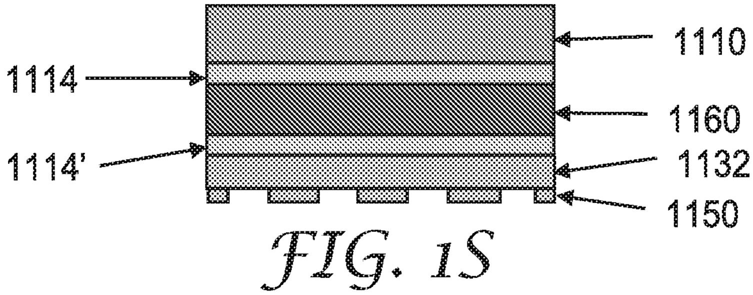
Figure 1T:
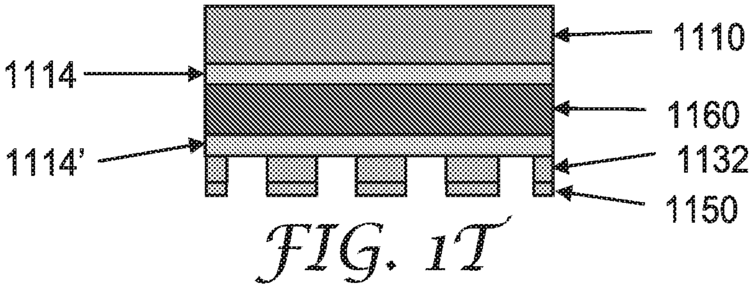
Figure 1U:
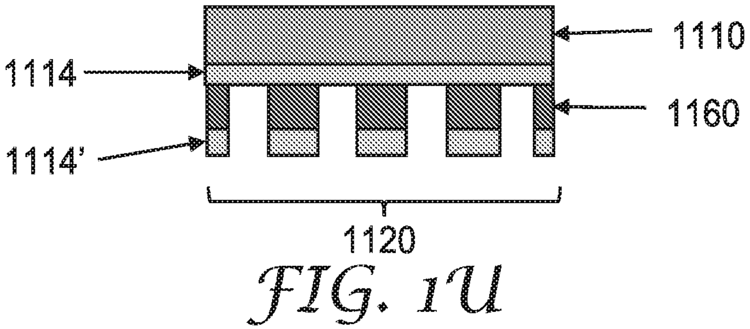
Figure 1V:
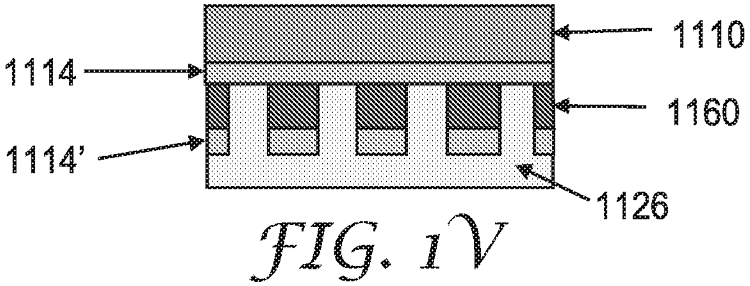
Figure 2P:
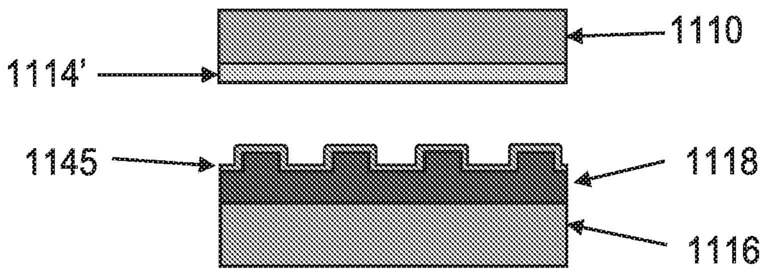
FIGS. 2P-2S are side view of another illustrative process.
Figure 2Q:
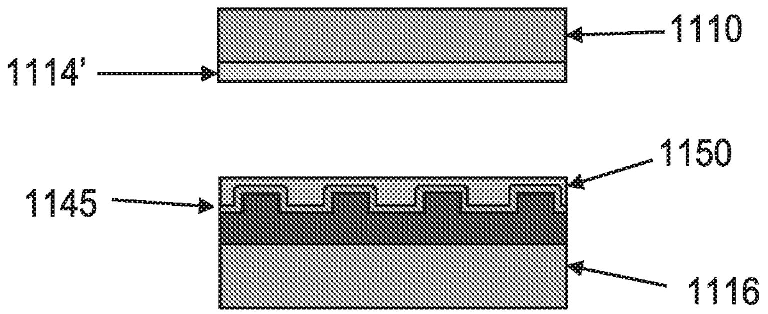
Figure 2R:
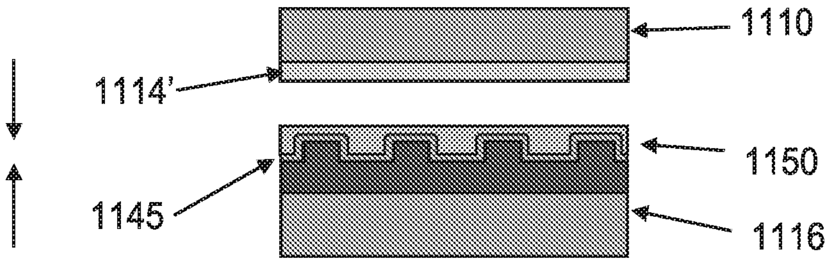
Figure 2S:
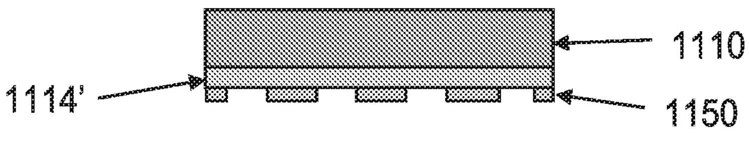

Referring to FIGS. 1N-1V, in other exemplary embodiments, the method of forming an etched nano-scale pattern typically comprises (n) providing a substrate (1116) having a patterned surface (1118), the pattern surface including one or more recessed features (1124), each recessed feature adjoining at least one plateau feature (1122) extending away from the recessed feature; providing a first substrate (1110) with a first etch resist layer (1114), (o) overlaying the first etch resist layer (1114) with a transfer layer (1160), (p) overlaying the transfer layer (1160) with a second etch resist (1114'), optionally overlaying a release coating (1145) on the patterned surface (1118), (q) optionally overlaying an adhesion promoting layer (1132) on the second etch resist (1114'), overlaying a masking layer (1150) on the patterned surface (1118) with optional release coating (1145); (r) overlaying the masking layer (1150) with the second etch resist (1114'); (s) removing the patterned surface of the first substrate (1110) from the second etch resist material (1114'); (t) etching the patterned surface to expose the second etch resist layer (1114') and (u) selectively etching the patterned surface of the second etch resist layer (1114') to remove at least a portion of the second etch resistant material, optionally etching into the transfer layer (1160), optionally etching to the surface of the first etch resist layer (1114), thereby forming the etched nano-scale pattern (1120). In some embodiments, the etched nano-scale pattern includes a multiplicity of nano-scale features. In some embodiments, the etched nanoscale pattern can be then filled with high index material (1126) as represented in FIG. 1V. In certain such embodiments, each nano-scale feature exhibits at least one dimension from 1 nm to 900 nm. In certain exemplary embodiments, at least one of the first substrate and the second substrate is flexible.

The polymerizable composition comprising the fluorinated (meth)acryl silane urethane compound(s), as described herein, can be utilized as masking layer (1150) that bonds to the etch resist.

The materials for the etch resist (e.g., etch-stop) layer 1114 or 1114' can be, but are not limited to, $Si_xC_yH_z$ (x=1, y=1~4, z=1~4), or $Si_xC_yN_2H_n$ (x=1, y=1~4, z=0~1, n=1~4), $Si_xN_y$ (x=1, y=0~1), $SiO_x$ (x=1~2), $Si_xO_yN_z$ (x=1, y=1~2, z=0~1), $SiH_x$ (x=1~4), and the like.

Thus, the polymerizable composition comprising the fluorinated (meth)acryl silane urethane compound(s), as described herein, exhibits good adhesion to siliceous (i.e. silicon-containing) materials and is surmised to exhibit good adhesion to other metal oxides and inorganic materials such as zirconia, alumina, and titania materials, as well as combinations of such materials. When the polymerizable composition is utilized as a mashing layer it releases from the (e.g. nanostructured) patterned surface such as the release treated template film (1116, 1118, and 1145).

The following examples are provided to further illustrate the presently described invention. The following examples are provided to further illustrate the presently described invention.

TABLE 1

| Materials | |
|---|---|
| Material designation | Description |
| PHOTOMER 6210 | Urethane acrylate oligomer available under the trade designation PHOTOMER 6210 IGM Resins, Charlotte, NC, United States |
| SR238 | 1,6-Hexandiol diacrylate available under the designation SR238, Sartomer Americas, Exton, PA, United States |
| SR351 | Trimethylolpropane triacrylate Sartomer Americas, Exton, PA, United States |
| MEK | Methyl ethyl ketone from Brenntag Great Lakes, Wauwatosa, WI, United States |
| PGME | Propylene Glycol Methyl Ether from Brenntag Great Lakes, Wauwatosa, WI, United States |
| Bis-(propyltrimethoxysilyl) amine (B-PTMS) | CAS number 82985-35-1, obtained as Silquest ™ A-1170 from Momentive Performance Materials, Waterford, NY, United States. |
| Desmodur ™ (Des) N100 | Biuret of hexamethylene diisocyanate, obtained from Covestro LLC, Pittsburgh, PA. |
| HFPO amidol (HFPO-C(O)NH$CH_2CH_2$OH) | Prepared by a method similar to that of Preparation No. 4a., Preparation of HFPO-C(O)NH$CH_2CH_2$OH as shown in U.S. Pat. No. 7,718,264 Column 23, lines 51-61. |
| HFPO Urethane Acrylate (HFPO UA) | Prepared by a method similar to that of Preparation No. 6, Preparation of Des N100/0.90 PET3A/0.15 HFPO as shown in U.S. Pat. No. 7,718,264 Column 25, lines 35-56, using HFPO amidol of Mn 1371, and pentaerythritol triacrylate of EW 500, at 65% solids in acetone |
| di-isopropylethylamine (Hunig's Base) | CAS 7087-68-5, obtained from Alfa Aesar, Haverhill, MA. |
| (3-mercaptopropyl) trimethoxysilane (MPTMS) | CAS number 4420-74-0, obtained from Alfa Aesar, Haverhill, MA. |
| N-methyl-3-aminopropyltrimethoxysilane (N-Me-APTMS) | CAS number 3069-25-8, obtained from Oakwood Chemical, Estill, SC. |
| Pentaerythritol triacrylate (PET3A) | Polyacrylate obtained as SR444C from Arkema, Exton, PA. |
| TPO | 2,4,6-trimethylbenzoyldiphenylphosphine oxide photoinitiator obtained as "IRGACURE TPO" from BASF. |

Preparation of Perfluoropolyether Urethane Acrylated Silanes from Michael Addition of Silanes to Perfluoropolyether Urethane Acrylates Calculation of the approximate acrylate equivalent weight of Des N100/0.90 PET3A/0.15 HFPO. One preparation of this material used the following equivalent weights for the materials. Desmodur N100, 191 EW (equivalent weight), approximately trifunctional. Pentaerythritol triacrylate (SR444C), EW 500. HFPO amidol (HFPO-C(O)$NHCH_2CH_2OH$), EW 1371.

The reaction product of all three reactants comprises compounds having the following structure:

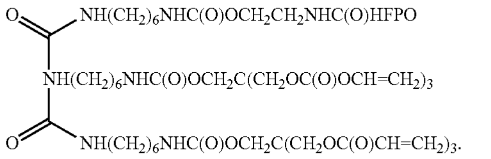

The calculated MW of this structure is 3*191+1371+2*500=2944 g/mole. The structure has 6 acrylates, so its acrylate EW is 2922/6=490.66 g/mole.

The reaction product of Des N100 and PET3A comprises compounds having the following structure:

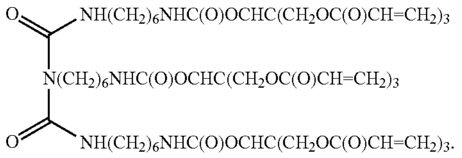

Its MW is 3*191+3*500=2073. The structure has 9 acrylates, so its acrylate EW is 2073/9=230.33.

Since the mixture of compounds comprises 15% of the material with HFPO amidol and 85% of the material without the HFPO amidol (the 0.05 equivalent of PET3A is not accounted for), the average acrylate EW for the mixture of compounds is: 0.15*490.66+0.85*230.33=269.38 or about 270 acrylate EW.

Preparation A of Des N100/0.90 PET3A/0.15 HFPO+0.11 mole fraction of acrylate functionality reacted with N-methyl-3-aminopropyltrimethoxysilane (N-Me-APTMS) (1900)

A 5.5 mL vial equipped with a rice grain stir bar was charged with 1 g of a 65% solids in acetone (dried over 4A molecular sieves) solution of Des N100/0.90 PET3A/0.15 HFPO (0.00240 acrylate equivalents) and 0.0503 g (0.00026 eq) N-methyl-3-aminopropyltrimethoxysilane (N-Me-APTMS). The reaction was stirred for 1 to 1.25 hours at room temperature. About 0.25 g of the reaction product was weighed into a vial along with 0.4 g deutero-acetone, and an $^1$H FTNMR showed the reaction to be complete.

Preparation B of Des N100/0.90 PET3A/0.15 HFPO+0.32 mole fraction of acrylate functionality reacted with N-methyl-3-aminopropyltrimethoxysilane (N-Me-APTMS) (1901)

Preparation B was carried out according to the procedure for Preparation A with 1 g of a 65% solids in acetone (dried over 4A molecular sieves) solution of Des N100/0.90 PET3A/0.15 HFPO (0.00240 acrylate equivalents) and 0.151 g (0.00078 eq) N-methyl-3-aminopropyltrimethoxysilane (N-Me-APTMS). $^1$H FTNMR analysis showed the reaction to be complete.

Preparation C of Des N100/0.90 PET3A/0.15 HFPO+0.32 mole fraction of acrylate functionality reacted with Bis-(propyltrimethoxysilyl) amine (B-PTMS) (1902)

Preparation C was carried out according to the procedure for Preparation A, with 1 g of a 65% solids in acetone (dried over 4A molecular sieves) solution of Des N100/0.90 PET3A/0.15 HFPO (0.00240 acrylate equivalents) and 0.2664 g (0.00078 eq) bis-(propyltrimethoxysilyl)amine (B-PTMS), with $^1$H FTNMR analysis showing the reaction to be about 25-30% complete.

Preparation D of Des N100/0.90 PET3A/0.15 HFPO+0.11 mole fraction of acrylate functionality reacted with (3-mercaptopropyl)trimethoxysilane (MPTMS)

Preparation D may be carried out according to the procedure for Preparation A, with 1 g of a 65% solids in acetone (dried over 4A molecular sieves) solution of Des N100/0.90 PET3A/0.15 HFPO (0.00240 acrylate equivalents) and 0.0510 g (0.00026 eq) (3-mercaptopropyl)trimethoxysilane (MPTMS) and 0.0026 g (5% by weight with respect to the MPTMS) di-isopropylethylamine (Hunig's Base).

Preparations A and B were combined with a polymerizable resin comprising 75 wt % Photomer 6210 with 25 wt % SR238 and 0.5% TPO, solvent (MEK and PGME) and compound i) at the amounts described in following Table 2.

TABLE 2

Solvent-based coating solutions

| Coating Solution | Mass Polymerizable Resin | Mass MEK | Mass PGME | Compound i) HFPO Urethane Acrylate | Reaction product of i) and amino silane |
|---|---|---|---|---|---|
| Comparative AA | 26 g | 87 g | 87 g | 2 g | 0 |
| BB | 26 g | 87 g | 87 g | 1 g | 1 g Preparation A |
| CC | 26 g | 87 g | 87 g | 0 g | 2 g Preparation A |
| DD | 26 g | 87 g | 87 g | 1 g | 1 g Preparation B |
| EE | 26 g | 87 g | 87 g | 0 g | 2 g Preparation B |

The coating solutions of Table 2 were utilized as masking layer (1150) in a method of forming an etched nano-scale pattern according to FIGS. 2P-2S.

In typical embodiments, the method would include first etch resist (1114) and transfer layer (1160), as described in WO 2020/095258 and FIGS. 1N-1V described above. However, in this particular set of experiments, the first etch resist (1114) and transfer layer (1160) were omitted such that adhesion failures between the masking layer (1150) and the second etch resist (1114') were isolated from adhesion failures between other layers.

With reference to FIGS. 2P-2S, substrate (1110) was a PET film (Melinex ST505 Du Pont Teijin Films, Chester, VA, United States) coated via plasma enhanced chemical deposition (PECVD) to form a silicon-containing etch resist (1114') with the composition ($SiC_xO_y$). The roll-to-roll PECVD process is described in WO 2020/095258, Example 6 Step 3, with the modification that the base pressure was 0.9mT (0.1 Pa), the oxygen flow rate was 2000 sccm for the $1^{st}$ treatment, and 1000 sccm for the $2^{nd}$ treatment.

A nano-featured template film (1116 & 1118) was prepared by die coating a polymerizable resin (comprising PHOTOMER 6210, SR238, SR351 and TPO in weight ratios of 60/20/20/0.5) onto a 125 micron thick polycarbonate film (1116) The coated film was pressed against a nanostructured nickel surface attached to a steel roller controlled at 60° C. using a rubber covered roller at a speed of 15.2 meters/min. The nanostructured nickel tool consisted of twelve 6 mm by 6 mm patterned areas with features ranging in size between 75 nm and 500 nm. The patterned area consisted of a multi-pitch pattern with pitches of 150, 200 and 250 nm with feature widths of half the pitch (75, 100, 125 nm).

The features were arranged in a square grid so that pitches were varied in both axes resulting in a nine unit repeating cell with rectangles of all combinations of widths mentioned above. In this repeating cell, the 150 nm pitch sections had 27 features, the 200 nm pitch sections had 20 features and the 250 nm pitch sections had 16 features. The features were about 200 nm tall and had side wall angles of approximately 4 degrees.

The coating thickness of polymerizable resin on the film was sufficient to fully wet the nickel surface and form a rolling bead of resin as the coated film was pressed against the nanostructured nickel surface. The film was exposed to radiation from two Fusion UV lamp systems (obtained under the trade designation "F600" from Fusion UV Systems, Gaithersburg, MD) fitted with D bulbs both operating at 142 W/cm while in contact with the nanostructured nickel surface. After peeling the film from the nanostructured nickel surface, the nanostructured side of the film was exposed again to radiation from the Fusion UV lamp system.

A release layer (1145) was deposited on the nano-featured template film via plasma enhanced chemical deposition (PECVD) with a release composition as described in WO 2020/095258. The PECVD process is described in Example 3 Step 2 of WO 2020/095258, with the modification that the base pressure was 0.9 mT (0.1 Pa), the oxygen flow rate was 2000 sccm for the $1^{st}$ treatment, and 1000 sccm for the $2^{nd}$ treatment.

With reference to FIG. 11Q, the release treated template film (1116, 1118, and 1145) was slot-die coated with the acrylate solutions of Table 2 at 0.05 meters per second to form masking layer 1150. The solution was coated 10.16 cm wide and pumped with a Harvard syringe pump at a rate of 1.2 sccm. The coating was partially cured 1.5 meters from the solution application using a 405 nm UV-LED system powered at 0.25 Amps at 40 volts. The coating experienced approximately 0.01 to 0.005 W/$cm^2$ irradiance in the UV-Visible spectrum.

The film was then dried at ambient conditions for 3 minutes before entering a nip. At the nip, the release treated nanostructure template film was introduced from an auxiliary unwind and laminated with etch resist (1114') disposed on substrate (1110). The nip consisted of a 90-durometer rubber roll and a steel roll set at 54° C. The nip was engaged by two Bimba air cylinders pressed by 0.28 MPa.

The solution was cured using a Fusion D bulb and the cured acrylate mixture masking layer (1150) was separated from the release treated template film remaining on the 3-layer film for the entirety of the 6 mm by 6 mm patterned areas. Web tensions were set to be approximately 0.0057 N/m.

As depicted in FIGS. 1R and 1S, the masking layer (1150) bonds to the etch resist material (1114') and releases from the release treated template film (1116, 1118, and 1145). The pattern of the etch resist material (1114') was evaluated to determine the pattern transfer quality according to the rankings as follows:

0—Failure to transfer any pattern to substrate

1—Major pattern transfer failure (>50% pattern transfer failure)

2—Minor pattern transfer failure (slight failure or tearing of pattern around edges)

3—Complete pattern transfer

TABLE 3

Replication results using Control (100% HFPO UA) and Different Levels of Preparations A and B

| Coating Solution Name | Composition of Release Layer | Ranking |
|---|---|---|
| AA | 100% HFPO Urethane Acrylate | 1 |
| BB | 50% Prep A<br>50% HFPO Urethane Acrylate | 2 |
| CC | 100% Prep A | 3 |
| DD | 50% Prep B<br>50% HFPO Urethane Acrylate | 2 |
| EE | 100% Prep B | 3 |

What is claimed is:

1. A compound comprising a perfluorinated group and a hydrolysable silane group having the following formula:

$$[R_f\text{-}QXC(O)HN]_m\text{-}R_i\text{-}[NHC(O)OQ(XC(O)C(R^4){=}CH_2)_p$$
$$|$$
$$(XC(O)CH_2CH_2R^1R^2Si(Y)_b(R^3)_{3\text{-}b})_a]_n$$

$R_i$ is the residue of a polyisocyanate;

$R_f$ is a monovalent perfluorooxyalkyl group;

Q is independently a covalent bond or an organic linking group having a valency of at least 2;

X is O, S or NR, wherein R is H or an alkyl group having 1 to 4 carbons;

$R^4$ is H or $CH_3$;

$R^1$ is —S— or —N($R^5$)—, wherein $R^5$ is $C_1$-$C_4$ alkyl or —$R^2Si(Y)_b(R^3)_{3-b}$;

$R^2$ is a divalent alkylene group optionally comprising one or more catenary oxygen atoms;

Y is a hydrolysable group;

$R^3$ is a non-hydrolysable group;

b is 1, 2, or 3;

m is at least 1;

n is at least 1;

for each n, p+a is no greater than 6 with the provisos that for at least one n, a is at least 1; and for at least one n, p is at least 1.

2. The compound of claim 1 wherein $R_i$ is the residue of a polyisocyanate selected from diisocyanate compounds and triisocyanate compounds.

3. The compound of claim 1 wherein $R_i$ comprises residues of diisocyanate oligomerization products.

4. The compound of claim 1 wherein m+n averages from 2 to 10.

5. The compound of claim 1 wherein $R_i$ is the residue of a diisocyanate, m+n averages 2, and both a and p average at least 1.

6. The compound of claim 1 wherein $R_i$ is the residue of a triisocyanate, m+n averages 3, n averages 2, and for each n, both a and p average at least 1.

7. The compound of claim 1 wherein $R_i$ is the residue of a triisocyanate, m+n averages 3, n averages 2, wherein for the first n, a is 0 and p averages 1; and for the second n, a averages 1 and p averages zero.

8. The compound of claim 1 wherein $R_i$ is the residue of a polyisocyanate such that m+n averages at least 4, 5, 6, 7, 8, 9, or 10; n averages at least 3, 4, 5, 6, 7, 8, 9, or 10, wherein for at least one n, a averages 0 and p averages 1; and for at least one n, a averages 1 and p averages zero.

9. An article comprising:

a film or film layer comprising a cured polymerizable composition comprising the compound or mixture of compounds of claim 1.

10. The article of claim 9 wherein the polymerizable composition further comprises non-fluorinated or fluorinated free-radically polymerizable monomer(s), oligomer(s), or a combination thereof.

11. The article of claim 9 wherein the film layer is disposed on a surface of a substrate.

12. The article of claim 11 wherein the surface of the substrate comprises a metal oxide.

13. The article of claim 12 wherein the film layer is disposed on a patterned surface.

14. The article of claim 13 wherein the patterned surface comprises nanostructures.

15. The article of claim 9 wherein the film layer is disposed on a patterned surface.

16. The article of claim 15 wherein the patterned surface comprises nanostructures.

* * * * *